United States Patent
Heigl

(10) Patent No.: US 6,971,668 B2
(45) Date of Patent: Dec. 6, 2005

(54) VEHICLE INTERIOR LINING ASSEMBLY

(75) Inventor: Jürgen Heigl, Böbingen (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 10/090,198

(22) Filed: Mar. 4, 2002

(65) Prior Publication Data

US 2002/0125697 A1 Sep. 12, 2002

(30) Foreign Application Priority Data

Mar. 6, 2001 (DE) .......................... 201 03 892 U

(51) Int. Cl.⁷ ...................... B60R 21/20; B60R 21/22
(52) U.S. Cl. .................. 280/730.2; 280/728.3; 280/749
(58) Field of Search .................. 280/728.3, 728.2, 280/730.2, 730.1, 749, 728.1

(56) References Cited

U.S. PATENT DOCUMENTS

| | | | |
|---|---|---|---|
| 5,788,270 A * | 8/1998 | Haland et al. ........... | 280/730.2 |
| 5,791,683 A * | 8/1998 | Shibata et al. ........... | 280/730.2 |
| 6,073,961 A | 6/2000 | Bailey et al. | |
| 6,079,732 A * | 6/2000 | Nakajima et al. ......... | 280/728.2 |
| 6,199,898 B1 | 3/2001 | Masuda et al. | |
| 6,234,515 B1 * | 5/2001 | Iwanaga .................. | 280/728.2 |
| 6,234,517 B1 * | 5/2001 | Miyahara et al. ......... | 280/730.2 |
| 6,279,944 B1 | 8/2001 | Wipasuramonton et al. | |
| 6,428,036 B1 | 8/2002 | Mramor et al. | |
| 6,447,005 B2 | 9/2002 | Alb et al. | |
| 6,467,799 B2 * | 10/2002 | Adomeit et al. ......... | 280/728.2 |

FOREIGN PATENT DOCUMENTS

| | | |
|---|---|---|
| DE | 19859539 | 6/2000 |
| DE | 20007930 | 10/2000 |
| GB | 2314300 | 12/1997 |

* cited by examiner

Primary Examiner—Eric Culbreth
(74) Attorney, Agent, or Firm—Tarolli, Sundheim, Covell & Tummino L.L.P.

(57) ABSTRACT

The invention relates to a vehicle interior lining assembly for a roof frame. The lining assembly comprises an interior lining and a gas bag module fastened to the lining, the gas bag module having a gas bag which extends substantially from an A-column of the vehicle to a C-column of the vehicle. The lining is comprised of at least two lining pieces which together with the gas bag module form a preassembled unit and which before a final installation of the unit in the vehicle are displaceable with respect to each other.

12 Claims, 2 Drawing Sheets

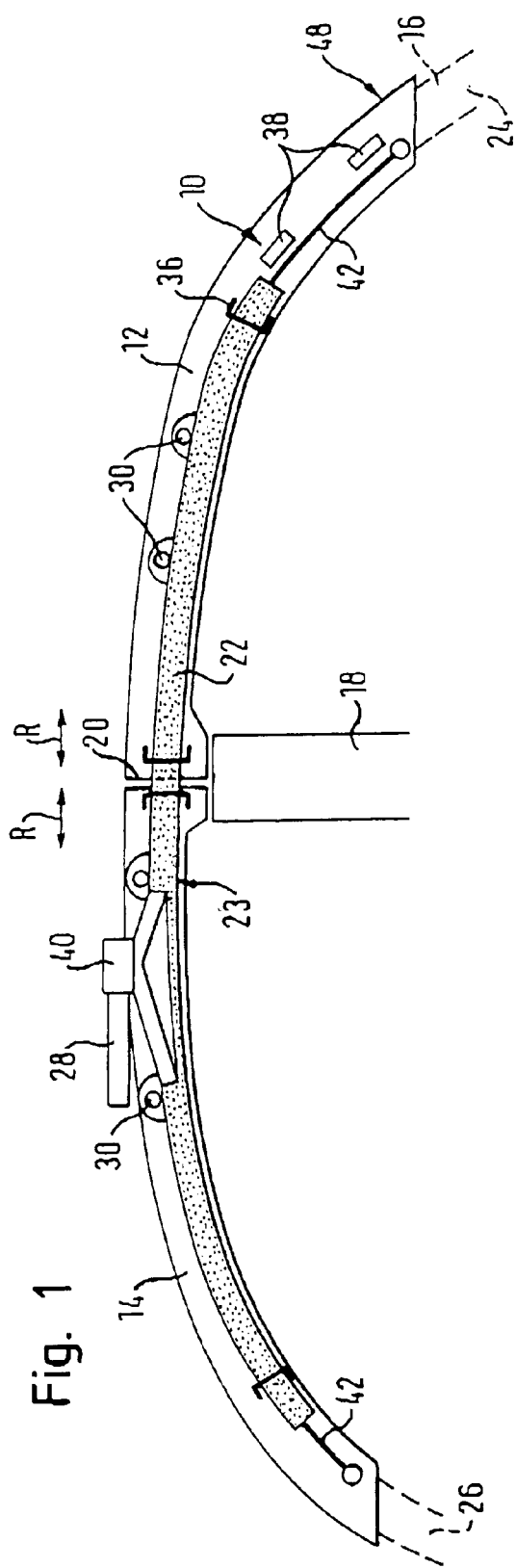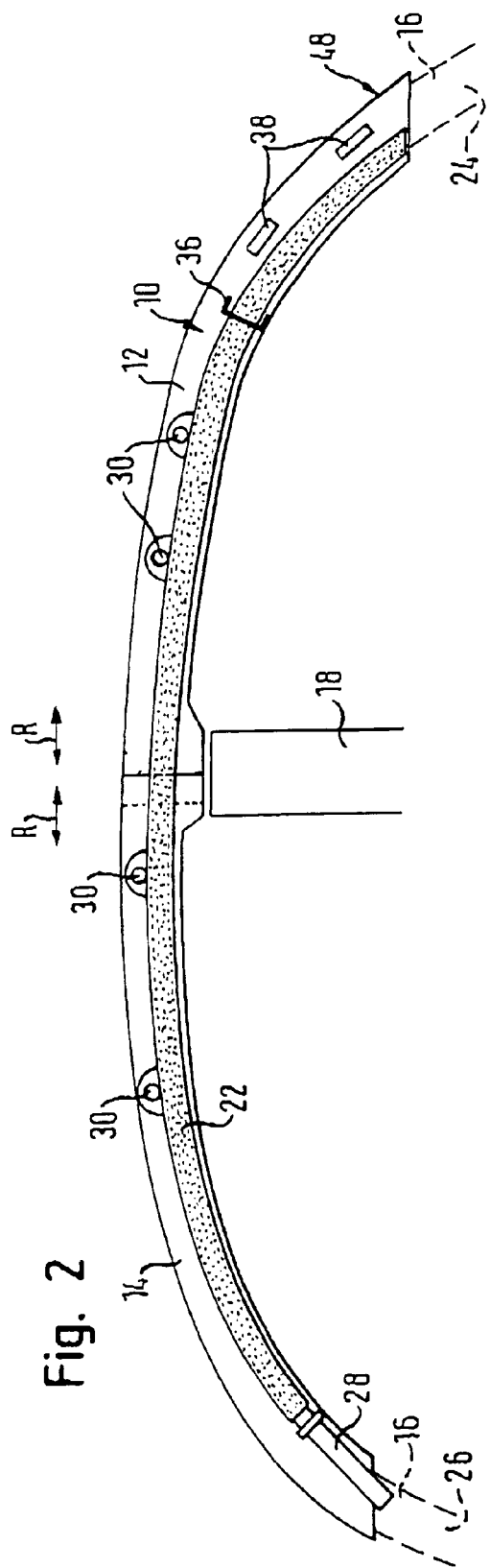

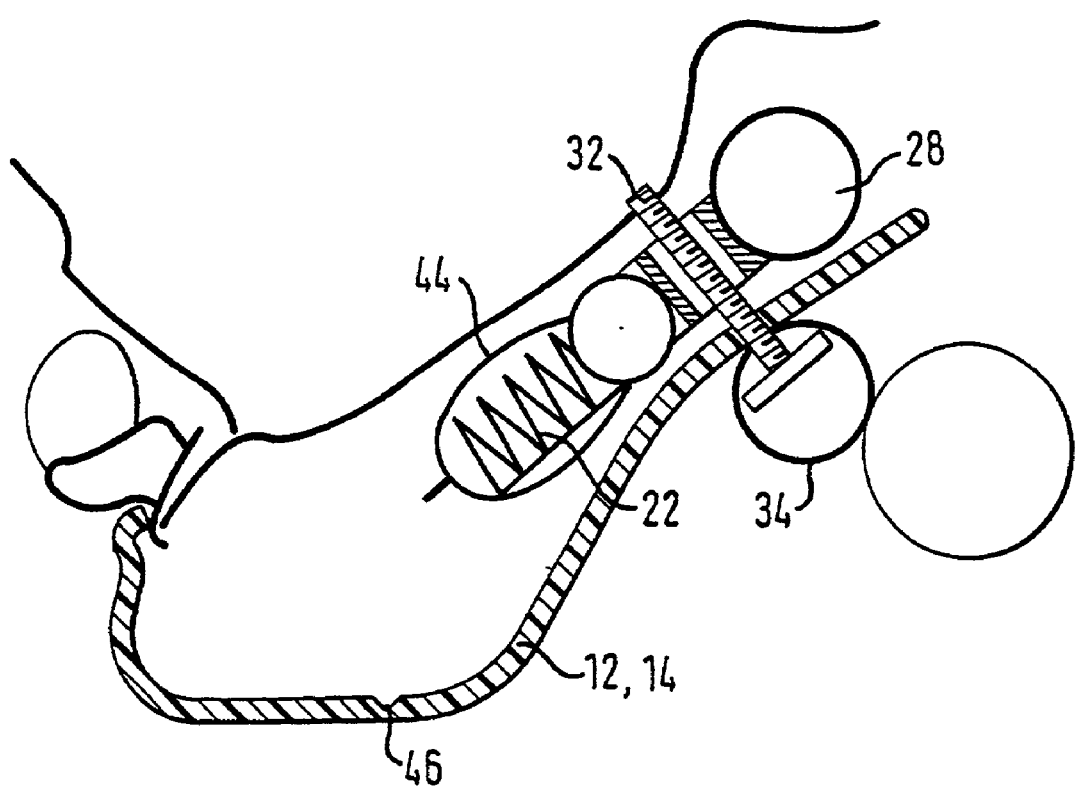

VEHICLE INTERIOR LINING ASSEMBLY

TECHNICAL FIELD

The invention relates to a vehicle interior lining assembly for a roof frame.

BACKGROUND OF THE INVENTION

Known vehicle interior lining assemblies comprise an interior lining and a gas bag module fastened to the lining, the gas bag module having a gas bag which extends substantially from the A-column to the C-column of the vehicle.

In order to reduce the number of individual parts and to save installation costs, it is favorable to design a lining of a roof frame of a vehicle such that it can receive a side gas bag. The side gas bag can be initially mounted on the lining and then fastened to the roof frame together with the lining.

As is known, vehicles have large tolerances with regard to spacing measurements. A preassembled unit of lining and gas bag module must easily adapt itself to the three-dimensional characteristics of the vehicles and be easily installed.

BRIEF SUMMARY OF THE INVENTION

This is achieved in a vehicle interior lining assembly which comprises an interior lining and a gas bag module fastened to the lining, the gas bag module having a gas bag which extends substantially from an A-column of the vehicle to a C-column of the vehicle. The lining is comprised of at least two lining pieces which together with the gas bag module form a preassembled unit and which before a final installation of the unit in the vehicle are displaceable with respect to each other. In this way, although the gas bag module is already firmly connected with the lining, the lining can be easily adapted to the specific three-dimensional design of a vehicle, and tolerances can be equalized.

It is particularly advantageous if the lining, when installed in the vehicle, is divided into the two lining pieces in the region of the B-column of the vehicle. Thus, in the region of the B-column, a separation joint or an overlapping can be realized, through which a tolerance equalization is ensured in a simple manner.

A further advantage can be achieved if the two lining pieces in the preassembled state are connected with each other via the gas bag module only. The connection can be realized such that the two lining pieces are able to be folded onto each other in the preassembled state. Thereby, handling during transportation of the lining is distinctly simplified and at the same time a protection of the gas bag module can be achieved through the two lining pieces.

It is favorable if a gas generator, which may be part of the gas bag module, is arranged in the region of the B-column when the unit is installed in the vehicle. The connection pieces connecting the gas generator with the gas bag can be arranged in the region of the separation joint between the two lining pieces and are thus easily accessible on installation of the unit.

Alternatively, in accordance with a conventional design, the gas generator can also be arranged at one end of the gas bag.

Further features of the invention will be apparent from the sub-claims.

BRIEF DESCRIPTION OF THE DRAWINGS

FIG. 1 shows a diagrammatic view of a first embodiment of a vehicle interior lining assembly according to the invention, installed in the vehicle, FIG. 2 shows a second embodiment of a vehicle interior lining assembly according to the invention, installed in the vehicle, and FIG. 3 shows a section through the vehicle interior lining assembly of FIG. 1 or 2, according to the invention, in an installed state in the vehicle.

DETAILED DESCRIPTION OF THE PREFERRED EMBODIMENTS

In FIGS. 1 and 2 the vehicle interior lining assembly 10 is illustrated such that parts actually lying behind it can be seen for reasons of clarification.

The vehicle interior lining assembly 10, illustrated in the Figures, comprises an interior lining with two elongated lining pieces 12, 14. The lining pieces 12, 14 extend in the installed state in the vehicle along a roof frame 16, the longitudinal axis of the lining pieces 12, 14 lying approximately parallel to the roof frame 16. The vehicle interior lining is divided into the two lining pieces 12, 14 in the region of a B-column 18. The narrow sides of the two lining pieces 12, 14, which meet each other in the region of the B-column, lie either directly against each other, are spaced apart from each other by a separation joint, or overlap each other. The separation joint 20 is indicated in the Figures.

A gas bag 22, which extends substantially from an A-column 24 to a C-column 26, runs inside the lining. The gas bag 22 has connection points for a gas generator 28, which can be produced according to known technology. In addition, the gas bag has fastening tongues 30.

The lining has openings (not shown) corresponding to the fastening tongues 30. The fastening tongues 30 are preferably arranged such that the gas bag 22 and the lining can be screwed to the roof frame at the same time via fastening screws 32, which serve to fasten a handle 34 to the vehicle. The folded gas bag 22, before the final installation of the lining assembly 10 on the vehicle, is preferably fastened to the lining pieces 12, 14 via holding clips 36. Further fastening elements 38 can be provided in order to fasten the lining assembly 10 to the vehicle.

The gas generator 28 can either be fastened in the region of the B-column 18, as shown in FIG. 1, with the gas generator 28 preferably having a gas distributor housing 40 which is connected with the gas bag 22, or the gas generator 28 can be fastened in the region of the C-column 26 (FIG. 2) and is then directly connected with the gas bag 22. The gas bag 22, the gas generator 28 and a gas distributor housing 40 which is optionally provided form a gas bag module 23. The embodiment according to FIG. 2 differs from that according to FIG. 1 only by the arrangement of the gas generator 28, so that the remaining parts bear the reference numbers already given.

In addition, tensioning bands 42 may be fastened to the gas bag, which are likewise fastened to the lining pieces 12, 14 before the installation of the lining assembly 10.

The lining assembly 10 is preferably fastened to the vehicle such that the gas bag 22 is reliably protected from damage and environmental influences. Therefore, an independent housing of the gas bag 22 can be dispensed with. The gas bag 22 may, as additional protection, be surrounded by a thin casing 44. This casing 44 does not have any structural stability. In order to make possible an emergence of the gas bag 22 in the case of restraint, a predetermined breaking point 46 can be provided in the lining pieces 12, 14.

The lining pieces 12, 14 may also have ribs or projections in order to keep the gas bag 22 in a favorable position and to guide it in a desired unfolding direction on emerging from the lining.

The installation of the vehicle interior lining assembly 10 according to the invention takes place as follows:

Firstly the gas bag 22 and possibly the gas generator 28 and also the gas distributor housing 40 are fastened to the two lining pieces 12, 14 which are placed adjacent to each other, so that a preassembled unit 48 is produced. This can take place by means of the fastening clips 36. The lining pieces 12, 14 are only held together in this stage via the gas bag 22, and are displaceable with respect to each other in longitudinal direction, as indicated by the double arrows R.

For transportation, the two shell-shaped lining pieces 12, 14 can be folded onto each other, so that the gas bag 22 comes to lie between them and is thus protected from damage.

The two lining pieces 12, 14 can be folded apart again at the vehicle manufacturer's and the lining assembly 10 can be attached to a roof frame 16 of a vehicle. By means of the tongues 30 and the corresponding openings in the lining pieces 12, 14, the lining and the gas bag 22 are securely fastened to the roof frame with the installation of the handle 34. As the lining pieces 12, 14 are displaceable with respect to each other and with respect to the gas bag 22 to a certain extent, the lining can be easily adapted to the specific vehicle characteristics, e.g. to slightly different positions of the handles 34. The lining pieces 12, 14 are preferably designed such that they can overlap each other, so that no gap is produced in the lining.

However, it is equally possible to design the lining such that on installation of the lining pieces 12, 14 a gap can arise between them, the lining finally being covered for example with a decorative material in order to cover this gap.

A further type of installation is also possible. Firstly, the lining piece 14, which extends from the B-column 18 to the C-column 26, and also the gas generator 28 can be installed in the C-column. Then the front part of the gas bag 22 with the front lining piece 12 can be installed between the B-column 18 and the A-column 24.

It is also possible to insert a gas lance, which extends either through the entire gas bag from the A- to the C-column or, for example, only from the A- to the B-column. Here, too, the lining pieces 12, 14 can be displaced with respect to each other, in order to carry out a tolerance equalization. In the second case, the lining pieces 12, 14 can also be folded onto each other, because the gas lance ends before the end of one of the lining pieces 14.

The parts not described in further detail in FIG. 3 are parts of the vehicle, e.g. a door seal.

What is claimed is:

1. A vehicle interior lining assembly for a roof frame, said assembly comprising:
   a vehicle interior lining, and
   a gas bag module fastened to said vehicle interior lining, said gas bag module having a gas bag which in a state installed in a vehicle extends substantially from an A-column of said vehicle to a C-column of said vehicle,
   said vehicle interior lining being comprised of at least two vehicle interior lining pieces, said vehicle interior lining pieces and said gas bag module being attached together by first fasteners to form a preassembled unit, said at least two vehicle interior lining pieces and portions of said gas bag module being displaceable in a longitudinal direction of said vehicle interior lining pieces with respect to each other to align and position said vehicle interior lining pieces and said gas bag module in said vehicle, and second fasteners provided for securing said vehicle interior lining to the vehicle thereby fastening said gas bag module to the vehicle.

2. The vehicle interior lining assembly according to claim 1, wherein said vehicle interior lining, when installed in said vehicle, is divided into said two vehicle interior lining pieces in a region of a B-column of said vehicle.

3. The vehicle interior lining assembly according to claim 2, wherein said two vehicle interior lining pieces, when installed in said vehicle and as viewed in the direction of a longitudinal axis of said vehicle interior lining pieces, are spaced apart from each other.

4. The vehicle interior lining assembly according to claim 1, wherein said second fasteners permanently install both said vehicle interior lining pieces and said gas bag in said vehicle.

5. The vehicle interior lining assembly according to claim 1, wherein said gas bag module has a gas generator which is part of said preassembled unit.

6. The vehicle interior lining assembly according to claim 5, wherein said gas generator is arranged in said region of a B-column when said unit is installed in said vehicle.

7. A vehicle interior lining assembly for a roof frame, said assembly comprising:
   a vehicle interior lining, and a gas bag module fastened to said vehicle interior lining, said gas bag module having a gas bag which in a state installed in a vehicle extends substantially from an A-column of said vehicle to a C-column of said vehicle,
   said vehicle interior lining being comprised of at least two vehicle interior lining pieces, said vehicle interior lining pieces and said gas bag module being attached together by first fasteners to form a preassembled unit, said at least two vehicle interior lining pieces and portions of said gas bag module being displaceable in a longitudinal direction of said vehicle interior lining pieces with respect to each other to align and position said vehicle interior lining pieces and said gas bag module in said vehicle, and second fasteners provided for securing said vehicle interior lining to the vehicle thereby fastening said gas bag module to the vehicle,
   said two vehicle interior lining pieces having opposing, longitudinal ends, which when installed in said vehicle and as viewed in the direction of a longitudinal axis of said vehicle interior lining pieces, are spaced apart from each other.

8. A vehicle interior lining assembly for a roof frame, said assembly comprising:
   a vehicle interior lining, and
   a gas bag module fastened to said vehicle interior lining, said gas bag module having a gas bag which in a state installed in a vehicle extends substantially from an A-column of said vehicle to a C-column of said vehicle,
   said vehicle interior lining being comprised of at least two vehicle interior lining pieces, said vehicle interior lining pieces and said gas bag module being attached together by first fasteners to form a preassembled unit, said at least two vehicle interior lining pieces and portions of said gas bag module being displaceable in a longitudinal direction of said vehicle interior lining pieces with respect to each other to align and position said vehicle interior lining pieces and said gas bag module in said vehicle, and second fasteners provided for securing said vehicle interior lining to the vehicle thereby fastening said gas bag module to the vehicle, and said two vehicle interior lining pieces, when installed in said vehicle, having longitudinal ends overlapping each other.

9. A vehicle interior lining assembly for a roof frame, said assembly comprising:

a vehicle interior lining with at least two vehicle interior lining pieces, each vehicle interior lining piece being visible from a passenger compartment and having a first longitudinal end, and a gas bag module fastened to said vehicle interior lining, said gas bag module including a cover for a gas bag, said gas bag module having a gas bag extending substantially form an A-column to a C-column of a vehicle in a state installed in said vehicle, said two vehicle interior lining pieces forming together with said gas bag module a preassembled unit in which said first longitudinal ends of said vehicle interior lining pieces are arranged at a variable but predetermined adjustment distance in a longitudinal direction of said vehicle interior lining pieces; and said vehicle interior lining being displaceable relative to said gas bag when installed on the vehicle roof frame.

10. The vehicle interior lining assembly according to claim 9 wherein both said cover and said vehicle interior lining open to enable air bag inflation.

11. The vehicle interior lining assembly according to claim 9 wherein by means of tongues and corresponding openings in the vehicle interior lining pieces, the vehicle interior lining and the gas bag are securely fastened to the roof frame with the installation of at least one handle.

12. A vehicle interior lining assembly for a roof frame, said assembly comprising:

a vehicle interior lining with at least two vehicle interior lining pieces, each vehicle interior lining piece being visible from a passenger compartment and having a first longitudinal end, and a gas bag module fastened to said vehicle interior lining, said gas bag module including a cover for a gas bag, said gas bag module having a gas bag extending substantially from an A-column to a C-column of a vehicle in a state installed in said vehicle, said two vehicle interior lining pieces forming together with said gas bag module a preassembled unit, in which said first longitudinal ends of said vehicle interior lining pieces are arranged at a variable but predetermined adjustment distance in a longitudinal direction of said vehicle interior lining pieces; and said vehicle interior lining being displaceable relative to said gas bag when installed on the vehicle roof frame, wherein both the cover and lining open to enable air bag inflation and said vehicle interior lining and said gas bag are securely fastened to the roof frame with the installation of at least one handle.

* * * * *